United States Patent
Herzog et al.

(10) Patent No.: US 8,453,970 B2
(45) Date of Patent: Jun. 4, 2013

(54) UNDER-FLOOR SYSTEM FOR AN AIRCRAFT

(75) Inventors: Mark Herzog, Barsbüttel (DE); Michael Dupont, München (DE)

(73) Assignee: Airbus Operations GmbH (DE)

( * ) Notice: Subject to any disclaimer, the term of this patent is extended or adjusted under 35 U.S.C. 154(b) by 645 days.

(21) Appl. No.: 12/532,675

(22) PCT Filed: Mar. 26, 2008

(86) PCT No.: PCT/EP2008/053521
§ 371 (c)(1),
(2), (4) Date: Sep. 23, 2009

(87) PCT Pub. No.: WO2008/119698
PCT Pub. Date: Oct. 9, 2008

(65) Prior Publication Data
US 2010/0116934 A1    May 13, 2010

Related U.S. Application Data (60) Provisional application No. 60/909,069, filed on Mar. 30, 2007.

(30) Foreign Application Priority Data

Mar. 30, 2007  (DE) .......................... 10 2007 015 520

(51) Int. Cl.
*B64C 1/18*      (2006.01)
(52) U.S. Cl.
USPC ..................... 244/118.6; 244/118.5; 52/220.1

(58) Field of Classification Search
USPC ............. 244/118.5, 118.6, 119, 137.1–137.2; 52/220.1, 263
IPC .......................................................... B64C 1/18
See application file for complete search history.

(56) References Cited

U.S. PATENT DOCUMENTS 2,093,859 A * 9/1937 Austin .......................... 296/178
4,005,902 A * 2/1977 Balin ............................ 297/129
(Continued)

FOREIGN PATENT DOCUMENTS

DE    10244189       6/2003
DE    102004050082 A1   4/2006
(Continued)

OTHER PUBLICATIONS

Chinese Office Action dated Dec. 13, 2011 from corresponding Chinese patent application (English translation of summary included).

*Primary Examiner* — Joseph W Sanderson
*Assistant Examiner* — Timothy Schwarz
(74) *Attorney, Agent, or Firm* — Lerner, David, Littenberg, Krumholz & Mentlik, LLP (57) ABSTRACT

The present invention relates to an under-floor system for providing a functional space for an aircraft. The under-floor system comprises a support-member structure and a cover element. The support-member structure is designed such that the support-member structure can be fastened to an aircraft structure element. The cover element can be fastened to the support-member structure such that the cover element is spaced apart from, for example, the aircraft floor. By means of spacing the cover element apart from the aircraft floor, the functional space can be provided.

6 Claims, 6 Drawing Sheets

U.S. PATENT DOCUMENTS

| | | | | |
|---|---|---|---|---|
| 5,453,933 | A * | 9/1995 | Wright et al. | 700/181 |
| 6,152,400 | A * | 11/2000 | Sankrithi et al. | 244/118.5 |
| 6,273,365 | B1 * | 8/2001 | Hiesener et al. | 244/118.1 |
| 6,527,566 | B1 | 3/2003 | Lambiaso | |
| 6,585,189 | B1 * | 7/2003 | Smallhorn | 244/118.5 |
| 6,824,104 | B2 * | 11/2004 | Smallhorn | 244/118.5 |
| 7,377,467 | B2 * | 5/2008 | Saint-Jalmes | 244/118.1 |
| 7,598,657 | B2 | 10/2009 | Frankenberger et al. | |
| 7,841,560 | B2 * | 11/2010 | Schumacher et al. | 244/118.5 |
| 7,931,047 | B2 * | 4/2011 | Gonnsen et al. | 137/899.2 |
| 8,074,928 | B2 * | 12/2011 | Haack et al. | 244/119 |
| 2002/0033432 | A1 * | 3/2002 | Mikosza | 244/118.6 |
| 2003/0146629 | A1 * | 8/2003 | Cheever | 292/167 |
| 2007/0080258 | A1 * | 4/2007 | Baatz et al. | 244/118.6 |
| 2007/0252038 | A1 * | 11/2007 | Santiago Alvarez | 244/118.1 |
| 2008/0099608 | A1 * | 5/2008 | Schumacher et al. | 244/118.6 |
| 2008/0116686 | A1 * | 5/2008 | Gonnsen et al. | 285/223 |
| 2008/0283662 | A1 * | 11/2008 | Park | 244/118.5 |
| 2009/0194635 | A1 * | 8/2009 | Ehlers et al. | 244/118.5 |
| 2010/0019087 | A1 * | 1/2010 | Warner et al. | 244/118.6 |
| 2010/0065681 | A1 * | 3/2010 | Gonnsen et al. | 244/118.5 |
| 2010/0116934 | A1 * | 5/2010 | Herzog et al. | 244/118.5 |
| 2010/0127123 | A1 * | 5/2010 | Hoffjann et al. | 244/118.1 |
| 2010/0219291 | A1 * | 9/2010 | Guering | 244/118.5 |
| 2010/0243802 | A1 * | 9/2010 | Ehlers et al. | 244/118.5 |
| 2011/0011978 | A1 * | 1/2011 | Haack et al. | 244/119 |
| 2011/0042514 | A1 * | 2/2011 | Ehlers et al. | 244/122 R |
| 2011/0062285 | A1 * | 3/2011 | Herzog et al. | 244/118.6 |
| 2011/0088243 | A1 * | 4/2011 | Herzog et al. | 29/525.01 |
| 2011/0309214 | A1 * | 12/2011 | Blees et al. | 248/125.2 |
| 2012/0012706 | A1 * | 1/2012 | Ehlers et al. | 244/118.5 |

FOREIGN PATENT DOCUMENTS

| | | |
|---|---|---|
| DE | 102005002370 A1 | 7/2006 |
| EP | 0010995 A1 | 5/1980 |
| GB | 2169256 A | 7/1986 |
| GB | 2382872 A | 6/2003 |
| JP | 58-78895 A | 5/1983 |
| JP | 2004537471 A | 12/2004 |
| JP | 2005239028 A | 9/2005 |
| JP | 2009500218 A | 1/2009 |
| JP | 2009526687 A | 7/2009 |
| WO | 03013942 A1 | 2/2003 |

* cited by examiner

UNDER-FLOOR SYSTEM FOR AN AIRCRAFT

CROSS-REFERENCE TO RELATED APPLICATIONS

This application is a national phase entry under 35 U.S.C. §371 of International Application No. PCT/EP2008/053521, filed Mar. 26, 2008, published in English, which claims the benefit of the filing date of German Patent Application No. 10 2007 015 520.6 filed Mar. 30, 2007 and of U.S. Provisional Patent Application No. 60/909,069 filed Mar. 30, 2007, the disclosures of which applications are hereby incorporated herein by reference.

FIELD OF THE INVENTION

The present invention relates to an under-floor system and a method for providing a functional space for an aircraft, as well as to the use of an under-floor system in an aircraft, and to an aircraft comprising an under-floor system.

BACKGROUND OF THE INVENTION

In aircraft cabins there is an ever increasing requirement for storage options for items of baggage and system elements, for example lines or pipes. Up to now, items of cabin baggage, i.e. baggage which passengers are allowed to take along into the aircraft cabin, had to be placed exclusively under the seat or in the overhead region, in the overhead stowage bins. In the overhead region, i.e. in the region above the passengers, there is thus a great need for storage space options for items of baggage. For this reason the overhead elements, for example the overhead stowage bins and the functional seat elements, such as the oxygen supply and light elements, have to be accommodated in an overhead unit. This may result in large-dimension overhead units that restrict the feeling of space in an aircraft cabin. Furthermore, there is an ever increasing requirement for accommodating installation options of system elements, e.g. due to the large number of additional functions of the seat.

Up to now there has been a further option of storing baggage in the foot region, underneath passengers' seats. This space is limited and restricts passengers' leg room when items of baggage are stored there. Furthermore, the installation region underneath the aircraft floor structure is used to install further functional elements. However, when the functional elements are accommodated in a lower region of the passenger cabin, for example in the cargo hold, access may be possible only to a limited extent.

SUMMARY OF THE INVENTION

There may be a need to increase storage space in an aircraft cabin.

According to exemplary embodiments of the present invention, an under-floor system for providing a functional space for an aircraft, a method for providing a functional space for an aircraft, the use of an under-floor system, as well as an aircraft comprising an under-floor system with the features according to the independent claims are provided.

According to an exemplary embodiment of the present invention, an under-floor system for providing a functional space for an aircraft is provided. The under-floor system comprises a support-member structure and a cover element. The support-member structure is designed such that the support-member structure can be fastened to an aircraft structure element. The cover element can be fastened to the support-member structure such that the cover element is spaced apart from the aircraft floor. By means of spacing the cover element apart from the aircraft floor, the functional space may be provided.

According to a further exemplary embodiment of the present invention, a method for providing a functional space for an aircraft is provided. A support-member structure is fastened to an aircraft structure element. A cover element is fastened to the support-member structure such that the cover element is spaced apart from an aircraft floor. By means of spacing the cover element apart from the aircraft floor a functional space is provided.

According to a further exemplary embodiment of the present invention, the under-floor system described above is used in an aircraft.

According to a further exemplary embodiment of the present invention, an aircraft with the under-floor system described above is provided.

The term "functional space" refers to a useable space in which functional elements, for example items of baggage or system elements, can be stored or installed.

The term "aircraft floor" refers to the so-called floor grids. These floor grids form the supporting structure of the floor of a cabin. Numerous installation devices, for example monuments or seat elements of an aircraft cabin, are fastened to the aircraft floor.

The term "support-member structure" refers to a structure that is in a position to hold the cover elements in a self-supporting manner.

With the under-floor system a type of double floor may be provided, in whose interspaces a functional space forms, in which functional space items of baggage or functional installations may be accommodated. The under-floor system may be installed in the aircraft cabin such that, for example, underneath the aisles or in the spaces between the seat rows of an aircraft cabin it may be possible to install functional spaces. The so-called functional space may be created underneath the foot space of the passengers, underneath the aisles, and underneath the actual seat, i.e. possibly along and across the entire length and width of the cabin. The surface above the cover elements may be used as a functional surface, for example for walking in aisles or as foot-space for seated passengers.

Furthermore, the functional space in the region between the aircraft floor and the cover element is easily accessible because only the cover element needs to be removed. Moreover, the cover elements may provide protection against soiling or other damage. In particular in the passenger region, in which soiling can often occur as a result of drinks being spilled, the functional elements or items of baggage installed or stored in the functional space are protected. Thus the usual system arrangement in the crown area, in other words in the overhead region of a passenger cabin of an aircraft, can be relocated to the functional space of the under-floor system, so that access is improved without there being an increase in the safety risk. As a result of the additional option of storing items of baggage in the functional space of the under-floor system, the overhead storage bins can be of a smaller design size or can be done without altogether. Furthermore, the aircraft's turn-around time (TRT) on the ground may be shortened because improved access to the baggage may be made possible, which baggage may be stored in the space underneath the seat area and the functional space that has been created underneath it. As a result of the baggage volume that has been increased in the Z-direction, i.e. in the height of the functional space, the X-direction of the volume, i.e. the longitudinal direction, can be kept short, which in turn may ensure adequate leg room. In this way the feeling of spaciousness in the aircraft cabin may be improved so that greater passenger comfort can be achieved.

As a result of good access to the functional space for baggage, furthermore, it may be possible to shorten the turn-around time, i.e. the time during which an aircraft is on the ground between two flights. Moreover, the safety of an aircraft is increased because in the case of an accident heavy items of baggage in the overhead region are subjected to greater loads than they are in a functional space in the under-floor system. Furthermore, as a result of the functional space available underneath the aisle, system lines, for example water pipes and waste water pipes, can be routed along the entire cabin length.

According to a further exemplary embodiment of the present invention, the cover element is designed such that the cover element is exchangeably fastenable to the support-member structure. Depending on the requirements of the cover element it may thus be possible to use various cover elements. Thus the cover element can, for example, adapt to various space requirements. For example, if less space is required, cover elements with smaller dimensions or adaptable cover elements may be used. In this way the under-floor system may be extremely flexibly matched to various cabin layouts.

According to a further exemplary embodiment of the present invention, the support-member structure comprises a self-supporting bar structure. The support-member structure can, for example, comprise a bar framework, thus providing good stability to the cover elements in place thereon. If a framework structure or bar structure is used, it is also possible to save weight. If the support-member structure is a self-supporting bar structure, furthermore, the loads acting on fastened aircraft structure elements can be reduced so that a more flexible arrangement of the support-member structure and thus of the under-floor system may become possible. Furthermore, with the lightweight bar structure the installation weight may be reduced.

According to a further exemplary embodiment of the present invention, the aircraft structure element is selected from the group comprising cabin elements, aircraft floors, frame elements, stringers and monuments. The structural elements of an aircraft fuselage predominantly comprise frame elements and stringers, to which the support-member structure can be fastened. The term "monuments" refers, for example, to lavatories (toilets), galley elements and other functional regions in an aircraft cabin.

According to a further exemplary embodiment of the present invention, the support-member structure and the cover element are modularly designed such that the support-member structure and the cover element are adaptable to a predeterminable cabin layout. For example, in particular in the case of a change in the cabin layout, for example from a first-class seating arrangement to a second-class seating arrangement, the dimensions of the support-member structure and of the cover elements may be flexibly interchanged. While in the first-class seating arrangement the aisles are wider and the seat pitch is greater, in the second-class seating arrangement the aisles are narrower and the seat pitch is shorter so that smaller support-member structures and cover elements need to be used. By means of predimensioned modules of the support-member structure and/or of the cover element, any form of a cabin layout may be reconfigured quickly and flexibly.

According to a further exemplary embodiment of the present invention, the support-member structure comprises an aircraft seat. The aircraft seat as a support-member structure may be fastened to an aircraft structure element. The cover elements may be fastened directly to the aircraft seat. If in practical application a cabin layout is altered, the aircraft seat including the cover panel may be displaced as a unit so that extremely short reconfiguration times can be achieved. Furthermore, due to fastening of the cover elements with the aircraft seat as a support-member structure, no further support of these cover elements may be necessary so that weight can be saved.

According to a further exemplary embodiment of the present invention, the functional space is designed such that functional elements can be stored. The functional space may be designed such that functional elements, for example lines, pipes or other system elements, are installed and by means of interfaces are connectable to other, adjacent, systems. If the support-member structure is an aircraft seat, then, for example, all the functional elements of the aircraft seat can be accommodated in the functional space. In this way an autonomous unit of the aircraft seat may be created, because, for example, all the devices situated on the ceiling and associated with the seats, for example emergency oxygen supply or light, can be arranged in the functional space. In this way the aircraft seat, including its necessary functional elements, may be displaced without this requiring reconfiguration measures in the ceiling region. If the support-member structure comprises a monument, for example a lavatory or galley, then it is possible to install, for example, flushing devices or drain devices in the functional space so that the monument, too, can be installed and deinstalled as a unit or as a module, and possibly a smaller base area is required. Furthermore, the support-member structures, for example the aircraft seat or the monuments, including their functional elements, can be pre-installed and pre-tested so that significantly faster turn-around times, reconfiguration times or installation times may be achieved.

According to a further exemplary embodiment of the present invention, the cover element is installed on the support-member structure such that, by means of an opening mechanism, access to the functional space may be provided. The cover elements may, for example, be fastened to the support-member structure by means of opening mechanisms, for example hinges or telescopic sliding mechanisms. In this way, by hingeing open or sliding open the cover elements, access to the functional space may be provided. Since the functional space is arranged in the floor region of the aircraft, good accessibility and reachability of the functional space may be possible. For example, passengers can inspect and use their baggage, which is located in the functional space, without having to leave their seats. Since all the items of baggage in the functional space can be stored by means of the cover flaps, aircraft safety may be improved. If functional elements, for example light elements or the emergency oxygen supply, are installed in the functional space, considerably easier access may be gained by means of the opening mechanism so that improved service and maintenance can be achieved. Repair- and maintenance durations may be shortened.

According to a further exemplary embodiment of the present invention, the opening mechanism comprises a locking mechanism. In this way the functional spaces may be secured against unauthorised access. In particular in the passenger region an option to lock the functional space may be a necessity because passengers should not be able to gain access to certain functional elements. The option of locking the functional space may also make it possible to install safety-relevant and other sensitive functional elements without unauthorised persons being able to gain access to them.

The embodiments of the under-floor construction apply to the method, to the use and to the aircraft and vice versa.

With the present invention a double-floor system is provided, as a result of which a functional space above the floor grids or the aircraft floor may be provided. This space can, for example, be used for routing system lines, installations of the seat elements, the so-called autonomous seats, and for baggage. Furthermore, in a region of monuments, for example lavatory installations, galley installations or other functional installations in a passenger cabin, the functional space can also be used for the systems required for the above. The passenger floor is composed of cover elements in the aisle region and of the cover elements between the seat elements, the so-called floor panels. In this way, in addition, a cabin layout can be altered quickly because the cover elements or floor panels can be variably designed. For example, the cover panels that are designed as flaps provide easy access to all the systems, and when closed provide good protection to interfaces or installed functional elements. For example, it may also be possible to install all the functional elements of an aircraft seat and to fasten the cover elements to the seat module so that an autonomous seat module can be created that comprises all the passenger-relevant functions. In this way pre-installation and pre-testing may become possible.

Furthermore, the baggage capacity may be increased by the additional functional space. Likewise, improved access to the functional space is achieved so that the turn-around time, i.e. the time in which an aircraft is situated on the ground, may be significantly reduced. All the items of baggage or the system installations in the functional space may be protected by the cover elements or floor panels; they improve accessibility to the systems and interfaces. Owing to the increase in storage space, an aircraft cabin with smaller bins can be designed, or overhead bins can be done entirely without. This may provide a better impression of space. Furthermore, a simpler ceiling region design may be implemented, which may also result in shorter installation times. Due to the storage of the items of baggage in the functional space of a floor region, crash safety may be improved.

BRIEF DESCRIPTION OF THE DRAWINGS

Below, for further explanation and to provide a better understanding of the present invention, exemplary embodiments are described in more detail with reference to the enclosed drawings. The following are shown.

DETAILED DESCRIPTION OF EXEMPLARY EMBODIMENTS

In the following description of the figures the same reference characters are used for identical or similar components. The illustrations in the figures are diagrammatic and not to scale.

Figure 3:
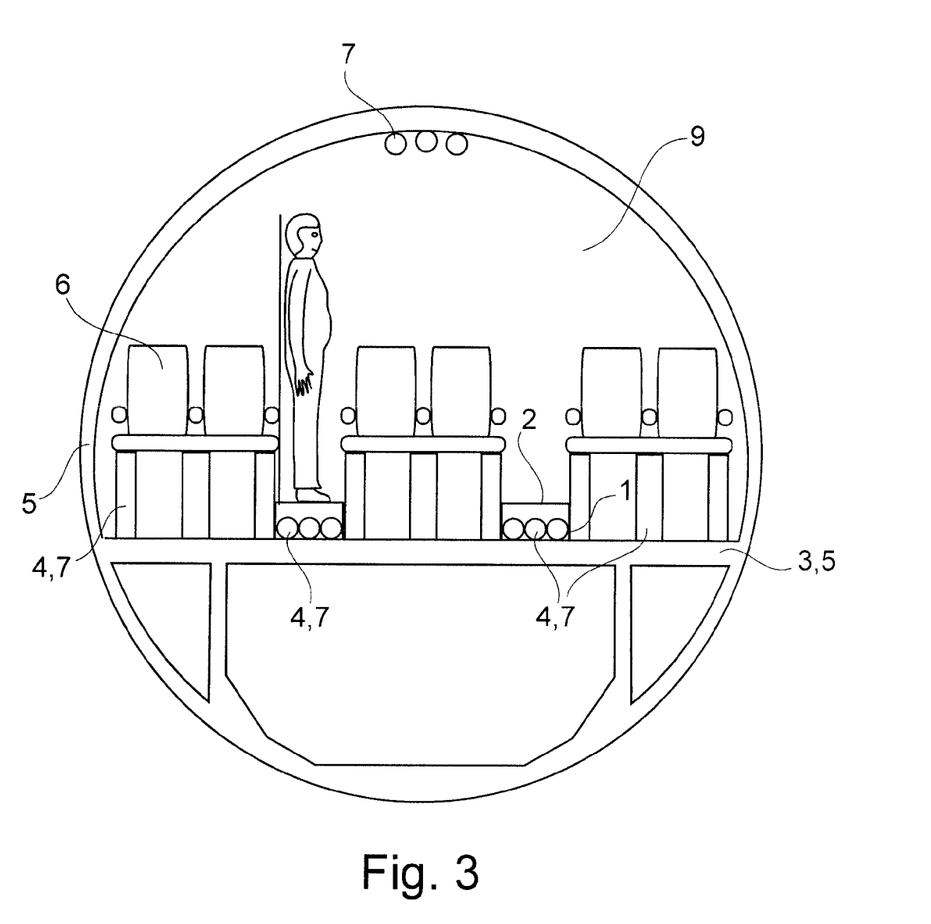
FIG. 3 a diagrammatic view of an exemplary embodiment of the under-floor system with reference to an aircraft cross section.

FIG. 3 shows an exemplary embodiment of the under-floor system for providing a functional space for an aircraft. The under-floor system comprises a support-member structure 1 and a cover element 2. The support-member structure 1 is designed such that the support-member structure 1 can be fastened to an aircraft structure element 3. The cover element 2 of a support-member structure 1 can be fastened such that the cover element 2 is spaced apart from the aircraft floor 3. By means of the spacing of the cover element 2 from an aircraft floor 3 the functional space 4 may be provided.

Figure 1:
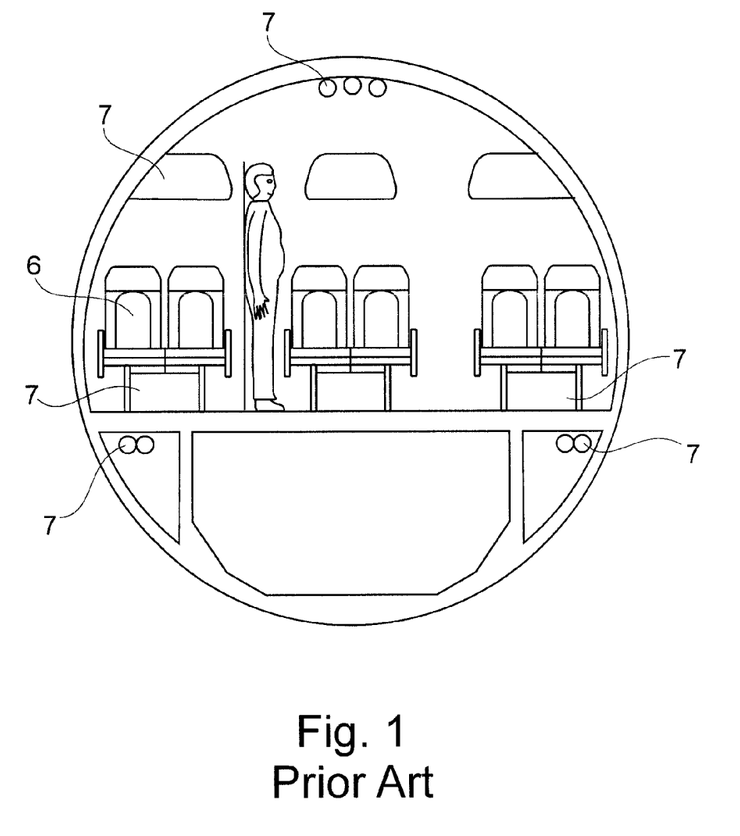
FIGS. 1, 2 diagrammatic views of aircraft seats with conventional storage options for items of baggage and system elements.
Figure 2:
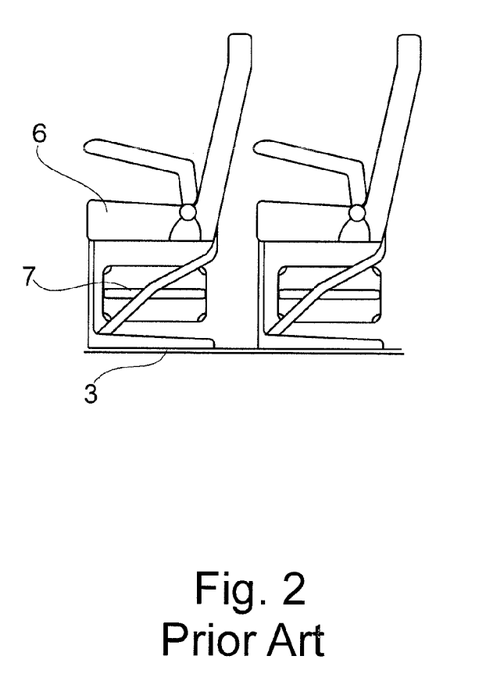

FIGS. 1 and 2 provide an overview of storage options in aircraft cabins without an additional functional space. The functional elements 7, for example items of baggage, pipelines, electrical lines or system elements, can be stored and installed in the crown area in overhead bins, as well as underneath the seat elements 6.

FIG. 2 shows a conventional aircraft seat that is connected to an aircraft floor 3. In this arrangement a passenger has the option of storing an item of baggage or a functional element 7 underneath the seat element 6. However, the available space underneath the seat element 6 may be reduced in this way so that legroom may be restricted. Furthermore, the items of baggage may not be well secured underneath the seat regions so that there may be an increased safety risk in the case of an accident.

FIG. 3 shows a cross section of a fuselage section with a cabin region and a cargo space in the lower region. Three seat units, each comprising two seats 6, are arranged in the aircraft cabin 9. In the aisles, the under-floor construction according to the invention is evident. The functional elements 7 may, for example, be installed in a functional space 4. In this way a support-member structure 1 supports cover panels 2 so that, for example, a passenger can move thereon. The support-member structure 1 can be fastened to the aircraft floor 3. Furthermore, the aircraft floor 3 forms part of the aircraft structure elements 5 that can take up self-supporting forces, thus providing good stability.

By routing the functional elements 7 in a functional space 4 in the cabin region 9, the accessibility of the functional elements 7 may be increased so that maintenance work may be accomplished more quickly.

Figure 4:
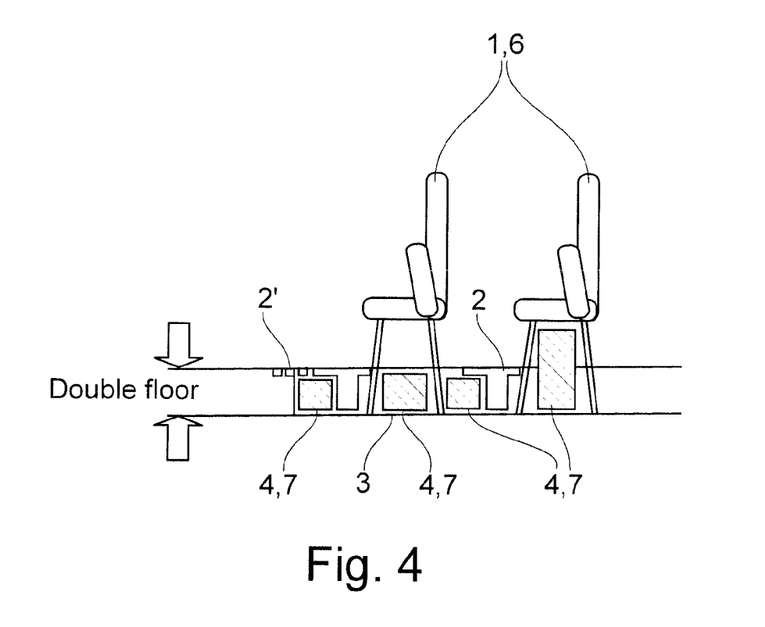
FIG. 4 a diagrammatic view of a lateral view of exemplary seat arrangements with an exemplary embodiment of the under-floor construction.

FIG. 4 shows an exemplary embodiment of the present invention, in which the support-member structure 1 comprises seat elements 6. The cover elements 2 are fastened to the support-member structure 1 or to the seat elements 6. The seat elements 6 themselves are fastened to an aircraft structure element 5, in the embodiment shown for example to an aircraft floor 3, and may thus be able to introduce the forces of the cover elements 2 into the aircraft structure. Between the aircraft floor 3 and the cover element 2 the functional space 4 is formed, in which functional space 4 it may be possible to install functional elements 7, for example system installations. The legroom underneath the seat elements 6 is not restricted in this arrangement. Moreover, cover elements 2' may be used that are variable in size. It may thus be possible to adapt to various cabin layouts, for example to a first-class seating arrangement or to a second-class seating arrangement.

Figure 5:
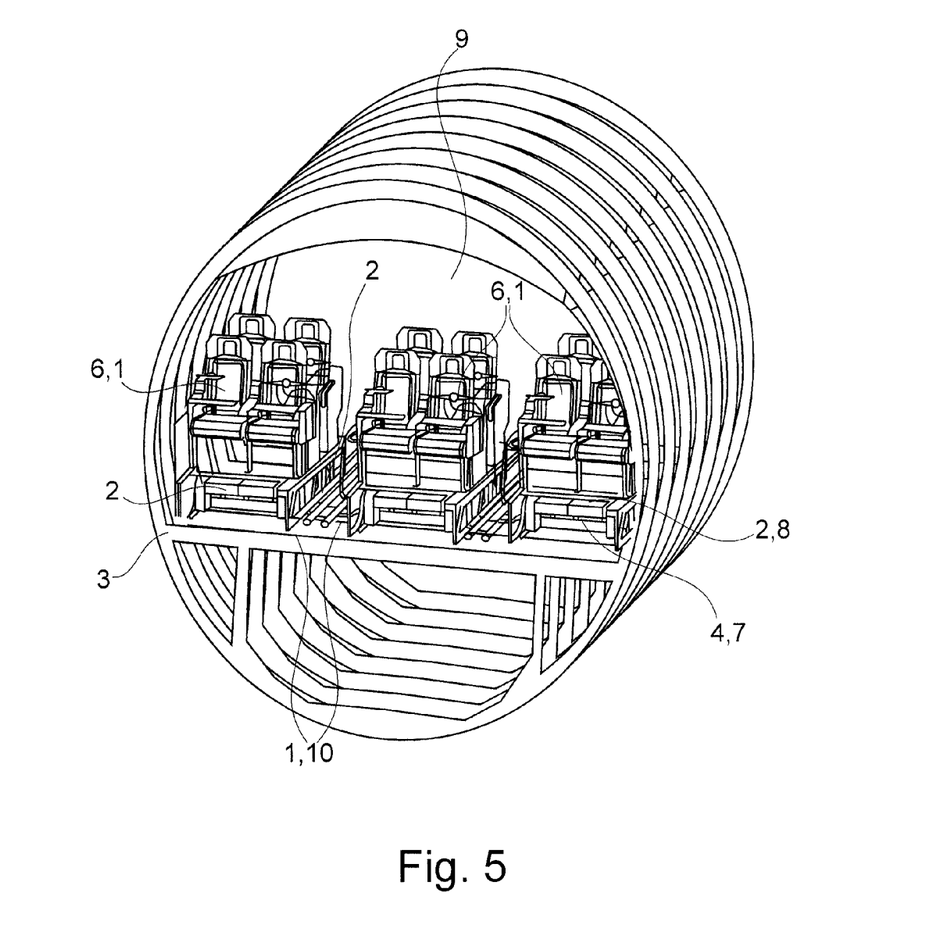
FIG. 5 a perspective view of a cabin layout with an under-floor construction according to an exemplary embodiment of the invention.

FIG. 5 shows a perspective view of a fuselage cross section with an exemplary cabin layout 9 in which the under-floor system is arranged. The cover elements 2 are, for example, arranged on the seat elements 6 or on a bar structure 10. Between the aircraft floor 3 and the cover element 2 the functional space 4 is formed, in which functional elements 7 can be arranged. The cover elements can be opened by means of an opening mechanism 8 so that access may be facilitated.

Figure 6:
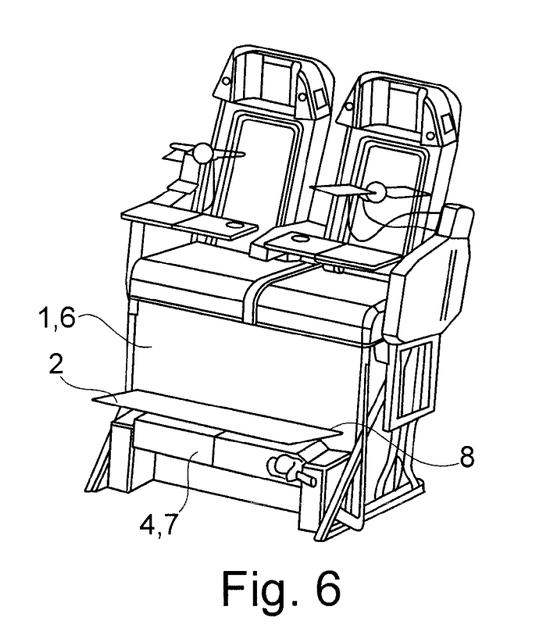
FIG. 6 a diagrammatic view of a seat module with the under-floor construction according to an exemplary embodiment of the invention.

FIG. 6 shows an exemplary embodiment of the seat elements 6 of FIG. 5. In FIG. 6 the aircraft seat 6 is designed as a modular and autonomous unit. The cover elements 2 are fastened to the support-member structure 1 or to the aircraft seat structure. Between the aircraft floor and the cover element 2 the functional space 4 is formed, in which functional elements 7 can be arranged. These functional elements 7 can designate either items of baggage belonging to passengers, or any system functions that are necessary for operating a passenger seat. For example multimedia systems, emergency oxygen supply systems, light systems or electricity supply systems can be installed in the functional space 4 of the seat 6. It is thus possible to create an autonomous aircraft seat 6 whose position can be altered in a simple manner, wherein said aircraft seat 6, due to the available functional space, is associated with fewer interface problems.

The seat module of FIG. 6 can furthermore be tested prior to installation. In the case of a defect in a functional element 7 the aircraft seat 6 can quickly be replaced by a corresponding aircraft seat module 6 so that repair times are short. FIG. 6 furthermore comprises an opening mechanism 8, by means of which the cover elements 2 can, for example, be hinged open.

Figure 7:
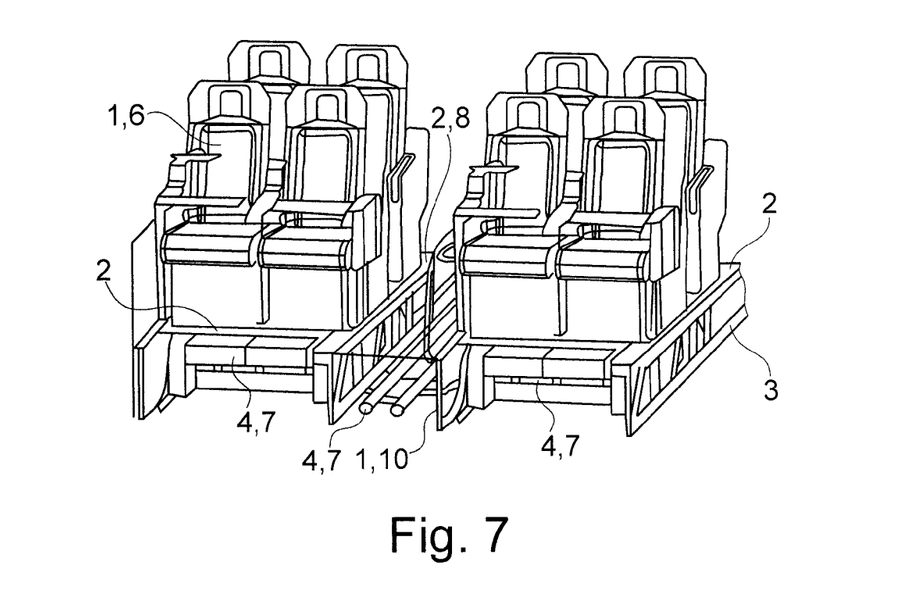
FIG. 7 a diagrammatic view of several seat modules of a cabin layout with the under-floor construction according to an exemplary embodiment of the invention.

FIG. 7 shows an arrangement of several aircraft seats 6 that are designed so as to be modular. As is the case in FIG. 6, in FIG. 7, too, the cover elements 2 are on one side arranged on the aircraft seat 6. In the foot region of the aircraft seat the functional space 4 is formed in which all the necessary system functions 7 of the aircraft seat 6 can be arranged. Furthermore, in this location there is the option of storing passengers' items of baggage.

FIG. 7 also shows an aisle region. A support-member structure 1, designed as a bar structure 10 is fastened to an aircraft floor 3 or to a floor rail. In this arrangement the bar structure 10 keeps the cover panels 2 spaced apart from the aircraft floor 3. The bar structure 10 can, for example, be constructed as a framework so that with this lightweight construction technique great stability can be achieved. The cover elements 2 can be fastened to the bar structure 10 by means of an opening mechanism 8. In this arrangement, for example, a sliding mechanism can be used. Furthermore, hinge techniques are also possible in order to hinge open the cover elements 2, thus providing access to the functional space 4. In the functional space 4 in the aisle region, for example lines or other system installations can be installed, as shown in FIG. 7. When compared to an installation of functional elements 7 in other regions of an aircraft, for example in the cargo hold or in the overhead region, accommodation of the functional elements 7 in the aisle region may provide better access and consequently better service and repair options.

The opening mechanism 8 can furthermore comprise a locking mechanism so that access by unauthorised persons, for example passengers, to the functional space 4 may be prevented.

FIG. 7 further shows a cabin layout 9 with a variable seat configuration. The aircraft seats 6 are fastened to a seat rail on the aircraft floor 3 so that their pitch may be varied. In this arrangement the cover elements 2 may be fastened so as to be exchangeable and may thus match the varied seat pitch.

Furthermore, variable cover elements 2 may also be used, which comprise variable size adjustment. The cover elements 2 may, for example, be designed so as to be telescopic, or they may be adjusted to various sizes by means of plug-type mechanisms.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Support-member structure
2 Cover element
3 Aircraft floor
4 Functional space
5 Aircraft structure element
6 Aircraft seat element
7 Functional element
8 Opening mechanism
9 Cabin layout
10 Bar structure

The invention claimed is:

1. An aircraft comprising a cabin with an aircraft floor and an under-floor system for providing a functional space, in which functional elements are located, wherein the under-floor system comprises:
   at least one seat module and;
   at least one aisle module;
   wherein the at least one seat module comprises a support member structure comprising an aircraft seat and at least one self-supporting bar structure with a bottom surface facing an aircraft floor, a top surface facing the aircraft seat located above the self-supporting bar structure;
   wherein the at least one self-supporting bar structure extends along the longitudinal direction of the cabin;
   wherein at least one self-supporting bar structure is fastened to an aircraft structure element;
   wherein the at least one aisle module is located adjacent to at least one of said at least one seat module and comprises an aisle module cover element exchangably fastenable to the to surface of the self-supporting bar structure such that the cover element is spaced apart from the aircraft floor and such that an aisle of the cabin adjacent to the at least one of said at least one seat module extends across the aisle module cover element;
   wherein the cover element space apart from and arranged above the aircraft floor and forms a double floor, defining a functional space arranged at least between the aisle module cover element and the aircraft floor and in which functional space system lines are provided along the entire longitudinal direction of the cabin.

2. The under-floor system of claim 1,
   wherein the aircraft structure element is selected from the group consisting of structural cabin elements, aircraft floors, a frame element, a stringer and a monument.

3. The under-floor system of claim 1,
   wherein at least the support-member structure and the cover element are modularly configured to be adaptable to a predeterminable cabin layout.

4. The under-floor system of claim 1,
   wherein the cover element is fastened to the support-member structure such that, by an opening mechanism, access to the functional space is provided.

5. The under-floor system of claim 4, wherein the opening mechanism comprises a locking mechanism.

6. A method for providing a functional space in which functional elements for an aircraft are located, the functional space being defined in an under-floor system for the aircraft,
   wherein the under-floor system comprises:
   at least one seat module and;
   at least one aisle module;
   wherein the at least one seat module comprises a support member structure comprising an aircraft seat and at least one self-supporting bar structure with a bottom surface facing an aircraft floor, a to surface facing the aircraft seat located above the self-supporting bar structure;
   wherein the at least one self-supporting bar structure extends along the longitudinal direction of the cabin;
   wherein the at least one aisle module is located adjacent to at least one of said at least one seat module and comprises an aisle module cover element exchangably fastenable to the to surface of the self-supporting bar structure such that the cover element is spaced apart from the aircraft floor and such that an aisle of the cabin adjacent to the at least one of said at least one seat module extends across the aisle module cover element;
   wherein the method comprises:
   fastening the at least one self-supporting bar structure, to an aircraft structure element;
   fastening the cover element to the self-supporting bar structure such that the cover element is spaced apart from the aircraft floor;
   wherein the cover element is spaced apart from and arranged above the aircraft floor and forms a double floor, defining a functional space arranged at least between the aisle module cover element and the aircraft floor and in which functional space system lines are provided along the entire longitudinal direction of the cabin.

* * * * *